United States Patent [19]
Ikkai et al.

[11] Patent Number: 5,592,355
[45] Date of Patent: Jan. 7, 1997

[54] MOTOR CONTROL CIRCUIT

[75] Inventors: Yasufumi Ikkai, Kobe; Satoshi Tamaki, Hirakata, both of Japan

[73] Assignee: Matsushita Electric Industrial Co., Ltd., Osaka-fu, Japan

[21] Appl. No.: 539,635

[22] Filed: Oct. 5, 1995

[30] Foreign Application Priority Data

Oct. 6, 1994 [JP] Japan .................................. 6-242734

[51] Int. Cl.$^6$ ...................................................... H02H 7/00
[52] U.S. Cl. ................................................ 361/94; 361/87
[58] Field of Search .................................. 361/18, 23, 28, 361/29, 30, 31, 59, 71–73, 87, 94, 97, 110

[56] References Cited

U.S. PATENT DOCUMENTS 4,084,204   4/1978   Jacobus, Jr. .................................. 361/72
5,460,531  10/1995   Tuchiya et al. ............................... 361/28

Primary Examiner—Jeffrey A. Gaffin
Assistant Examiner—Ronald W. Leja
Attorney, Agent, or Firm—Greenblum & Bernstein P.L.C.

[57] ABSTRACT

When the supply current from a pulse width modulation (PWM) inverter drive circuit supplying current to the motor in an electric-powered motor vehicle is an overcurrent exceeding a particular current level, a monitoring circuit outputs a fail signal to disable the PWM inverter drive circuit and lower the current level. When the current level drops to or below said particular current level, the monitoring circuit re-enables the PWM inverter drive circuit to resume supplying current. If the cumulative output time of the fail signal exceeds a particular period, the PWM inverter drive circuit is determined to not be operating normally, and PWM inverter drive circuit operation is therefore interrupted.

5 Claims, 7 Drawing Sheets

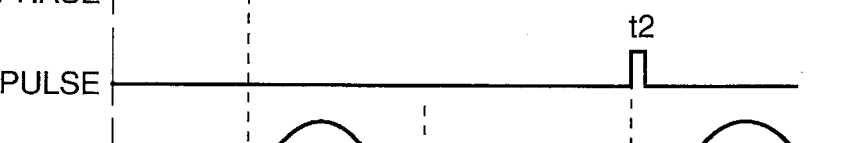
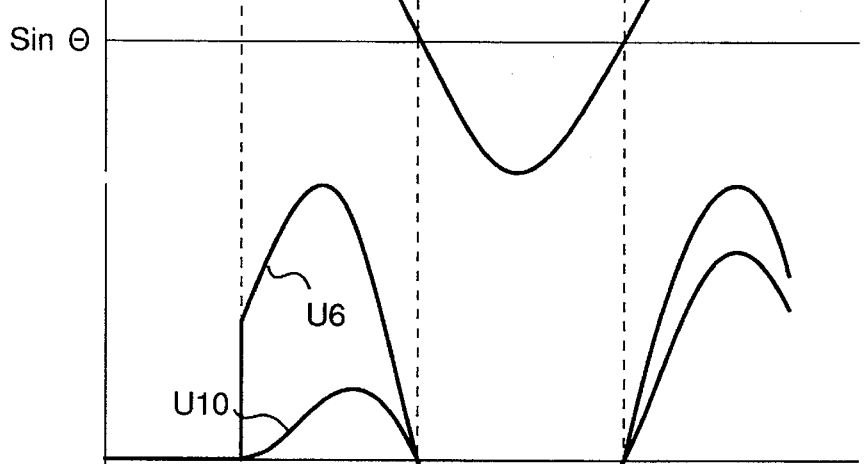
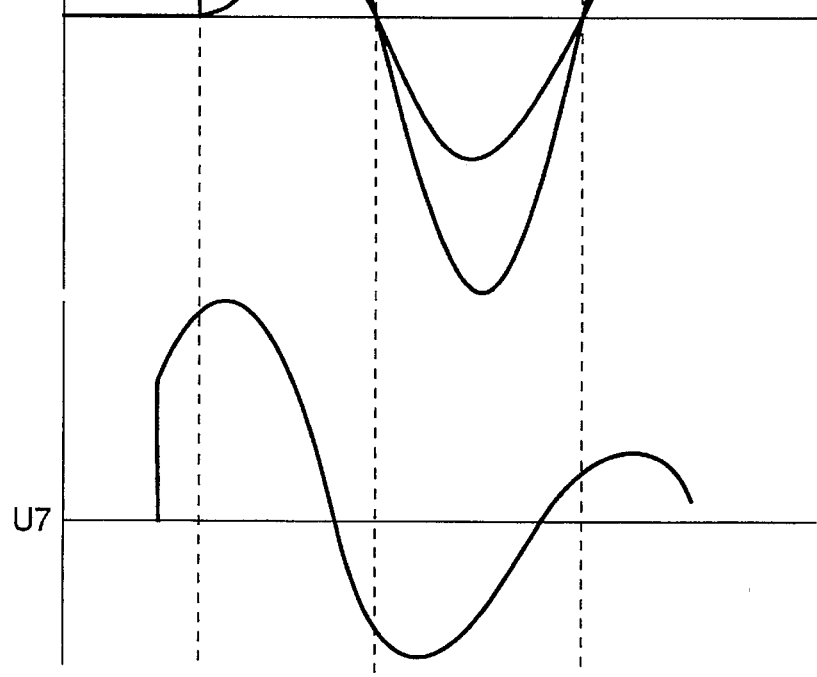

MOTOR CONTROL CIRCUIT

BACKGROUND OF THE INVENTION

1. Field of the Invention

The present invention relates to a motor control circuit, and particularly to a control circuit for protecting the motor providing the motive power in an electrically-powered motor vehicle.

2. Description of the Prior Art

The development of electrically-powered motor vehicles, particularly electric cars, has been pursued in recent years as one means of addressing environmental problems. The power source for these vehicles is either an AC or DC motor. In particular, high efficiency synchronous motors using a permanent magnet for the rotor are being actively developed for electric cars.

While synchronous motors of this type are widely used in factory automation applications in industry, they are also suited for use in electric cars, and the basic control method is essentially the same.

In the factory automation field, overcurrent control by the power element controlling the motor immediately outputs a stop signal when an overcurrent is detected, and completely stops the motor. If this same control principle is applied in an electric car, however, the vehicle may suddenly and unexpectedly stop, creating an obvious safety hazard that could result in a rear-end collision with the vehicle following behind.

A control method whereby the current supply is completely and immediately cut off when the motor current exceeds a predetermined threshold value may thus cause the vehicle to suddenly stop, creating a life-threatening situation and obvious safety problem. On the other hand, failure to interrupt the current supply when an overcurrent to the motor is detected may result in serious damage to the motor, and is also not desirable.

In addition to damaging the power element and/or motor, however, an overcurrent can also cause a car fire. An electric car control circuit whereby these hazards can be reliably prevented and the vehicle can safely avoid hazardous situations caused by problems related to the motor current supply is therefore necessary.

Therefore, an object of the present invention is to provide a control circuit providing for improved safety in electric car operation by temporarily interrupting the motor power supply as a means of eliminating an overcurrent supply to the motor when a motor overcurrent is detected, and completely shutting off the motor power supply if a value integrating the overcurrent detection time exceeds a predetermined time limit.

SUMMARY OF THE INVENTION

To achieve the aforementioned object, a motor control circuit according to the present invention comprises a current detector (a current transformer) for detecting the current flowing to the motor, i.e., the current flowing to the power element; a drive circuit for supplying current to the power element; a drive voltage control circuit for outputting a voltage signal for driving the drive circuit; and a monitoring circuit for monitoring the detection current output from the current detector and the drive voltage output from the drive voltage control circuit, and outputting a fail signal when the detected drive current exceeds a predetermined reference drive current or when the drive voltage exceeds a predetermined reference drive voltage. When the fail signal is output, drive circuit operation is temporarily stopped to interrupt the current supply to the power element and temporarily prevent an overcurrent supply. When the overcurrent disappears, the drive circuit is again operated to supply current to the power element. However, if the cumulative current supply interrupt time exceeds a constant time limit within a predetermined period, drive circuit is shut down completely.

Sudden and unexpected stopping of the electric car can therefore be prevented by means of this constitution because the drive circuit is temporarily stopped and current supply to the power element is interrupted when the current supplied to the power element exceeds a predetermined threshold value, and current supply is resumed when the current level drops below a known threshold value. In addition, if the current supply to the power element repeatedly and frequently exceeds this threshold value, drive circuit operation is stopped completely to completely interrupt the current supply to the power element and thereby prevent vehicle fires and other accidents, and motor damage.

BRIEF DESCRIPTION OF THE DRAWINGS

The present invention will become more fully understood from the detailed description given below and the accompanying diagrams wherein:

FIGS. 5A, 5B, 5C, 5D, 5E, and 5F are signal waveform diagrams of the control circuit shown in FIG. 1;

DESCRIPTION OF PREFERRED EMBODIMENTS

Figure 1:
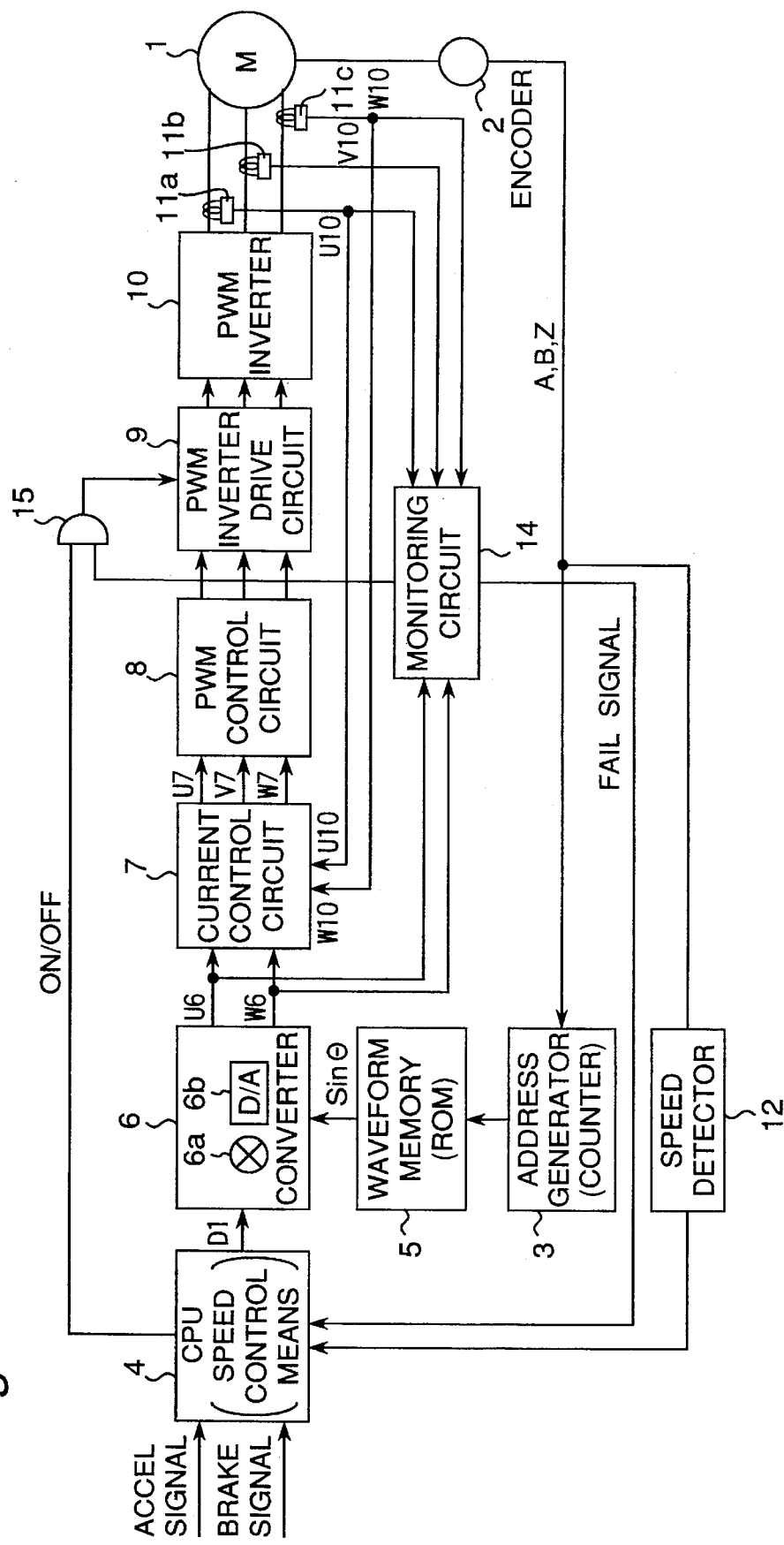
FIG. 1 is a block diagram of a motor control circuit according to the preferred embodiment of the present invention.

The first embodiment of a motor control circuit according to the present invention is described below with reference to the accompanying figures, of which FIG. 1 is a block diagram of a motor control circuit according to the preferred embodiment.

The motor 1 is a synchronous motor, and in this embodiment is an AC servo motor driven by a three-phase (U, V, W) current. An encoder 2 is also disposed to the motor 1 for outputting a known pulse quantity, e.g., 2000 pulses (A-phase), during each revolution of the motor shaft. The encoder 2 also outputs B-phase pulses shifted p/2 phases from the A-phase pulse, and a Z pulse (see FIGS. 5B and 5C). The A-phase, B-phase, and Z pulses are output to the address generator 3 and speed detector 12.

The address generator 3 is a counter that is reset by the Z pulse, and counts from 1–4000 using the A- and B-phase pulses. More specifically, count of the address generator 3 increments one every $2p/4000^{th}$ rotation of the motor shaft. The count obtained by the address generator 3 is output as an address signal to the waveform memory (ROM) 5, which stores a sine wave value in $2p/4000^{th}$ increments. As a result, the waveform memory 5 outputs a sine wave-equivalent signal value (FIG. 5D) as the count from the address generator 3 rises.

Inputs to the CPU 4 include accelerator and brake signals indicating operation of the accelerator and brake pedals, respectively, a motor speed signal calculated by the speed detector 12 using the A- and B-phase pulses and the Z pulse, a vehicle speed signal calculated using the required gear and other parameters, and the fail signal output from the monitoring circuit 14, which is described below. Based on these inputs, the CPU 4 outputs signal D1 determining the amplitude and frequency of the motor input signal, and an ON/OFF signal determining whether to supply power to the motor 1. Signal D1 is output with the sine signal from the waveform memory 5 to the converter 6.

The converter 6 comprises a multiplier 6a and D/A converter 6b, multiplies the amplitude signal supplied from the CPU 4 and the sine signal supplied from the waveform memory 5, D/A converts the result, and outputs the U-phase voltage signal $U_6$ and W-phase voltage signal $W_6$. It is to be noted that a V-phase signal is not output because U-phase+ V-phase+W-phase=0, and if two phases are known, the third phase can be calculated therefrom.

Using the input U-phase voltage signal $U_6$ and W-phase voltage signal $W_6$, the current control circuit 7 generates the sine-wave U-phase current signal $U_6$ and W-phase current signal $W_6$. The U-phase current signal $U_{10}$ and W-phase current signal $W_{10}$ actually supplied to the motor 1 are also fed back to the current control circuit 7.

The current control circuit 7 is a comparator for comparing the generated U-phase current signal $U_6$ with the U-phase current signal $U_{10}$ supplied to the motor (see FIG. 5E), and outputting the difference (see FIG. 5F). It similarly compares the generated W-phase current signal $W_6$ with the W-phase current signal $W_{10}$ actually supplied to the motor 1, and outputs the difference. The current control circuit 7 also calculates the V-phase value. The current control circuit 7 thus compares the ideal sine wave current signals $U_6$ and $W_6$ with the current signals $U_{10}$ and $W_{10}$ actually supplied to the motor, and outputs the corresponding difference signals $U_7$, $V_7$, and $W_7$.

It is to be noted that the maximum tolerance for the U- and W-phase voltage signals $U_6$ and $W_6$ output from the converter 6 is ±5 V.

The PWM control circuit 8 then applies a known signal processing operation to the difference signals $U_7$, $V_7$, and $W_7$, and outputs the result to the PWM inverter drive circuit 9. The PWM inverter drive circuit 9 is enabled or disabled based on the result of an AND operation performed on the ON/OFF signal from the CPU 4 and the inverted fail signal from the monitoring circuit 14.

The PWM inverter 10 comprises three power elements for the U-, V-, and W-phases, and thereby outputs a three-phase power supply current for motor drive. In this embodiment the maximum current tolerance of the power elements is ±100 A.

The current output from the power elements is then applied to the motor 1, and the motor 1 turns. The current detectors 11a, 11b, and 11c (current transformers) detect the actual U-, V-, and W-phase supply current values. The detected U-, V-, and W-phase current signals $U_{10}$, $V_{10}$, and $W_{10}$ from the current detectors 11a, 11b, and 11c, and the U- and W-phase voltage signals $U_6$ and $W_6$ output from the converter 6, are input to the monitoring circuit 14.

Figure 2:
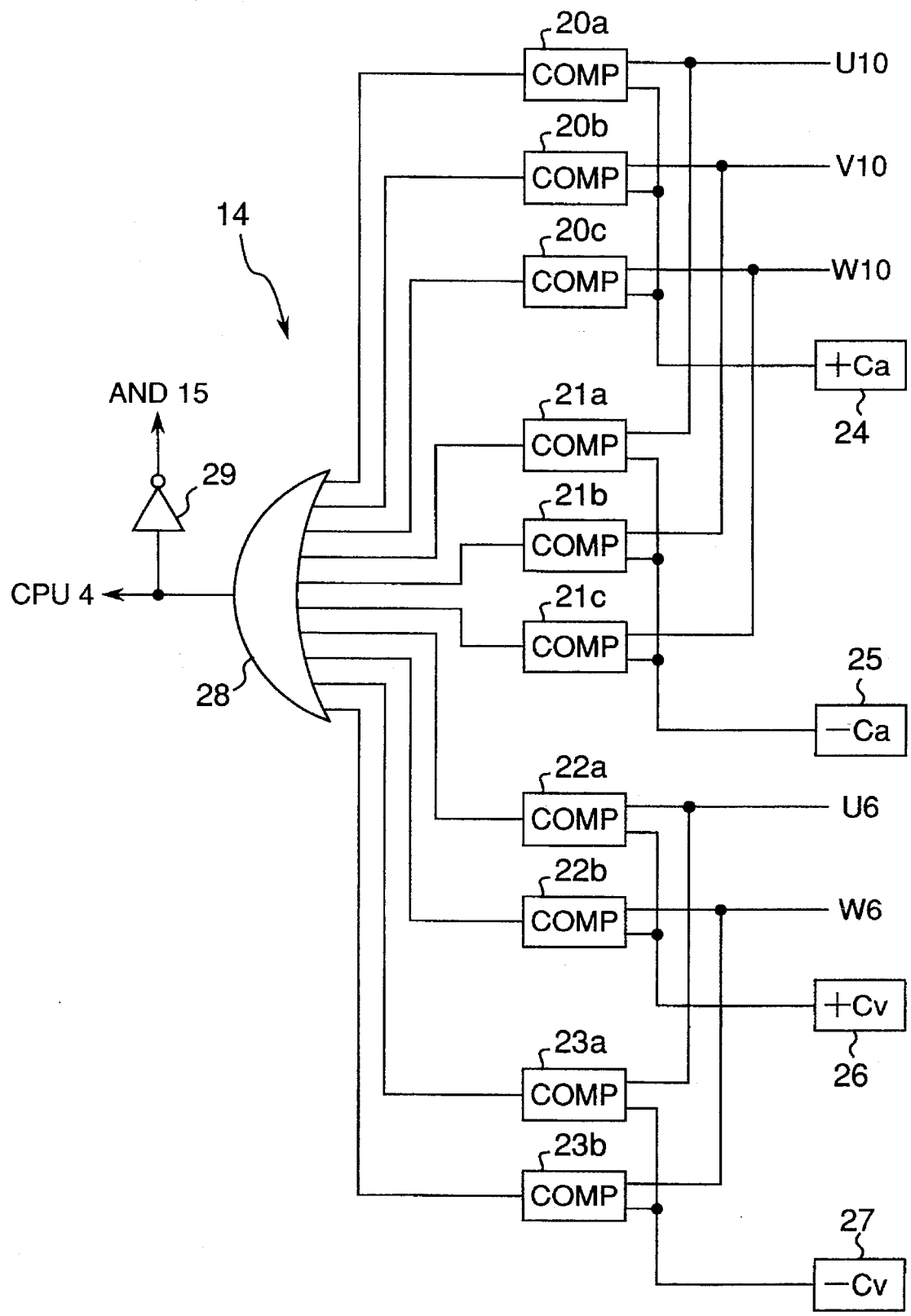
FIG. 2 is a detailed circuit diagram of the monitoring circuit shown in FIG. 1.

FIG. 2 is a detailed circuit diagram of the monitoring circuit 14. As shown in FIG. 2, the monitoring circuit 14 comprises ten comparators 20a, 20b, 20c, 21a, 21b, 21c, 22a, 22b, 23a, 23b; four reference value circuits 24, 25, 26, 27; OR circuit 28; and inverter 29.

The U-, V-, and W-phase current detection signals $U_{10}$, $V_{10}$, and $W_{10}$ are input to one input of comparators 20a, 20b, 20c, respectively, and a +100A equivalent signal (+Ca) from reference value circuit 24 is input to the other input of said comparators.

The U-, V-, and W-phase current detection signals $U_{10}$, $V_{10}$, and $W_{10}$ are also input to one input of comparators 21a, 21b, 21c, but a −100A equivalent signal (−Ca) from reference value circuit 25 is input to the other input of said comparators.

The U-phase voltage signal $U_6$ and W-phase voltage signal $W_6$ output from the converter 6 are input to one input of comparators 22a, 22b, respectively, and a +5V equivalent signal (+Ca) from reference value circuit 26 is input to the other input of said comparators.

The U-phase voltage signal $U_6$ and W-phase voltage signal $W_6$ output from the converter 6 are also input to one input of comparators 23a, 23b, respectively, and a −5V equivalent signal (−Ca) from reference value circuit 27 is input to the other input of said comparators.

All ten comparators output to the OR gate 28. The OR gate output is input to the CPU 4 as the fail signal, and is inverted by the inverter 29. The inverter 29 outputs the inverted fail signal to the AND gate 15. The fail signal is a LOW level signal during normal operation. When a current supply problem develops, i.e., when the maximum current of any one of the power elements (U-, V-, or W-phase) exceeds +100 A (or is less than −100 A), a HIGH is output from one of the comparators 20a–21c, and is output as a fail signal through the OR gate 28. In addition, if the U- or W-phase voltage signal output from the converter 6 exceeds +5V (or is less than −5V), a HIGH is output from one of the comparators 21a–23b, and is output as a fail signal through the OR gate 28. The fail signal is thus inverted by the inverter 29, and the inverted fail signal is supplied to the AND gate 15.

The starting operation of the control circuit shown in FIG. 1 is described below.

It is assumed that a double amplitude command instructing the motor to rotate is output from the CPU 4 at time t1 (FIG. 5A). A sine value corresponding to the rotational angle of the position at which the motor 1 last stopped is output from the waveform memory 5 until time t1. A U-phase voltage signal $U_6$ equivalent to twice the sine wave at time t1 is output from the converter 6 (while the description below is limited to the U-phase, the following description is also applicable to the other phases), and the current control circuit 7 calculates the difference between a signal equivalent to the U-phase voltage signal $U_6$ and a signal equivalent to the current from the U-phase power element. The PWM inverter drive circuit is driven based on this difference signal, and current equivalent to said difference is output from the power elements and supplied to the motor 1. The motor 1 thus accelerates to the speed equivalent to the signal D1 from the CPU, and once the target speed is reached the motor 1 continues to operate at a stable speed.

The operation when a large current exceeding +100A (or less than −100A), i.e., an overcurrent, is supplied to a power element, or when the U- or W-phase voltage signal output from the converter 6 exceeds +5V (or is less than −5V), i.e., an overvoltage is output, is described next.

Figure 6A:
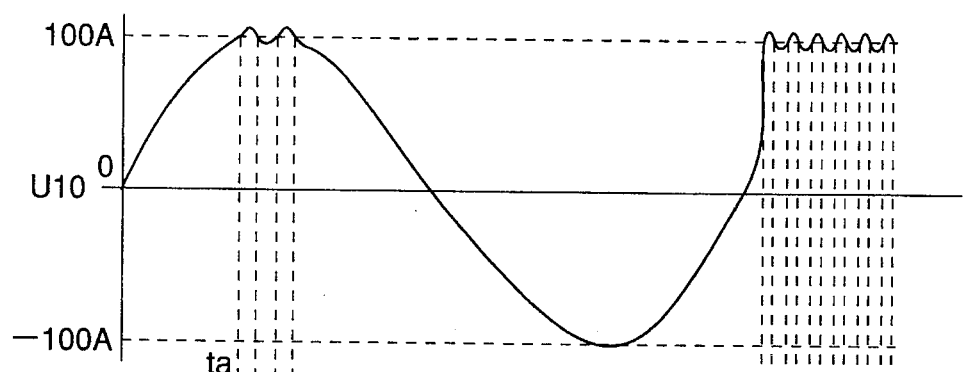
FIGS. 6A, 6B, 6C, 6D, and 6E are signal waveform diagrams used to describe the operation when the current supplied to the power element becomes an overcurrent.
Figure 6B:

FIG. 6A shows the signal waveform when an overcurrent is supplied to the motor. If an overcurrent exceeding 100-A occurs at time $t_a$, the fail signal immediately changes from LOW to HIGH (FIG. 6B), and inverter operation switches from ON to OFF (FIG. 6E). Because there is a resulting immediate drop in motor current $U_{10}$, the motor current drops to 100 A or less, the fail signal becomes LOW again, and the inverter switches ON. If the motor current $U_{10}$ again rises above 100 A, the fail signal again becomes HIGH and inverter switches OFF. When the motor current again drops to 100 A or less, the fail signal becomes LOW again, and the inverter switches ON. This HIGH-LOW switching of the fail signal is repeated at short intervals.

Figure 6C:
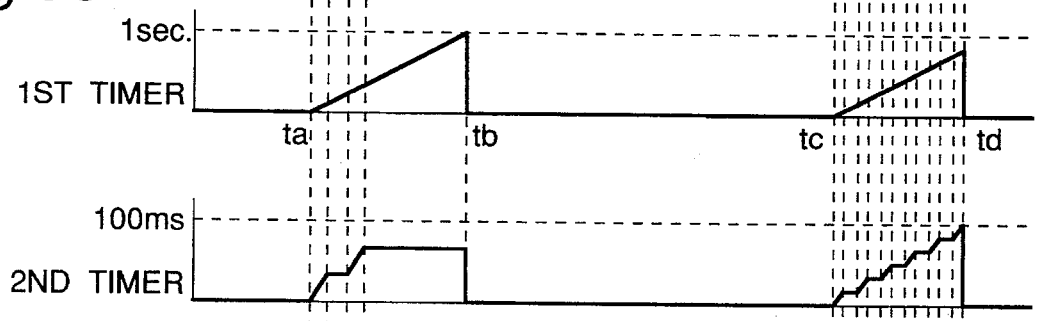

CPU 4 also comprises first and second timers with the second timer incrementing the count only when the fail signal is HIGH (FIG. 6C). Fail signal counting starts when the fail signal first changes state from LOW to HIGH, i.e., at time $t_a$, and continues for a predetermined period. For example, counting continues in this embodiment for a one-second period counted by the first timer; during this period, the second timer counts the time the fail signal is HIGH. If the cumulative fail signal HIGH time counted by the second timer is less than 100 ms during the one-second period counted by the first timer, the second timer is reset at the end of said one-second period, i.e., at time $t_b$ in FIG. 6C.

Figure 6D:
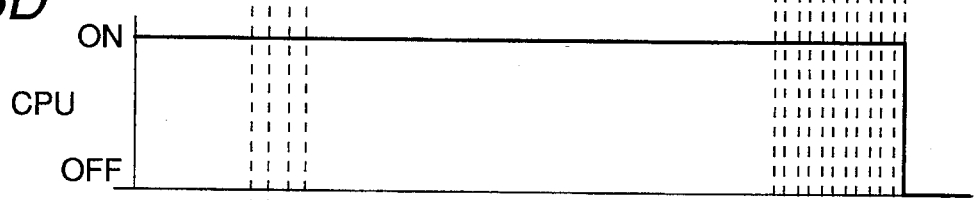
Figure 6E:
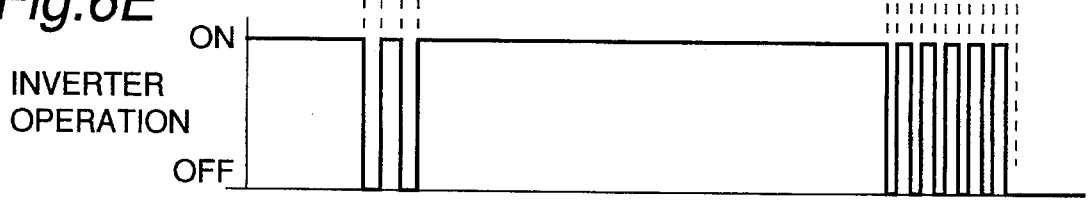

The first and second timers again begin counting when the fail signal next becomes HIGH, e.g., at time $t_c$. As described above, the second timer continues counting the fail signal HIGH time while the first timer counts a continuous one-second period. If the fail signal becomes LOW during this continuous one-second period, the second timer holds the count, and thus accumulates the total fail signal HIGH time. If the fail signal HIGH time counted by the second timer during the continuous one-second period reaches 100 ms, it is determined that a problem preventing resumption of stable operation has occurred, and the CPU 4 outputs an OFF signal completely turning the PWM inverter drive circuit 9 off at time $t_d$ (FIG. 6D).

Figure 7A:
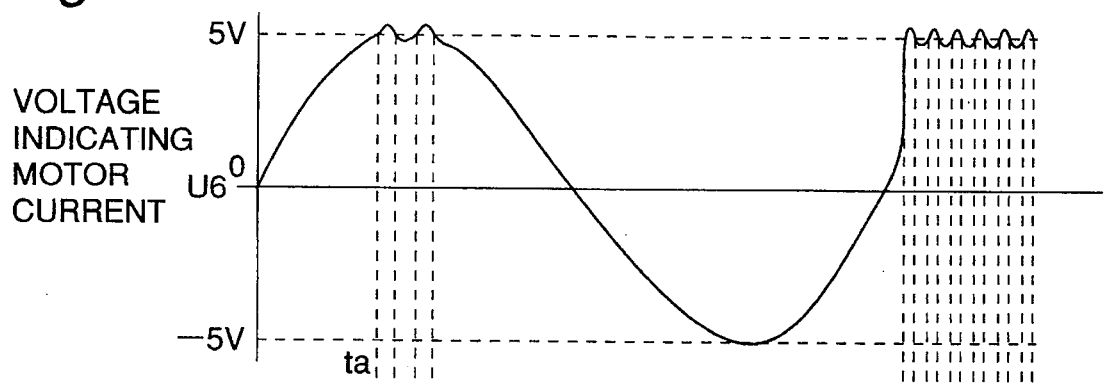
FIGS. 7A, 7B, 7C. 7D. and 7E are signal waveform diagrams used to describe the operation when the voltage signal output from the drive voltage control circuit is an overvoltage.
Figure 7B:
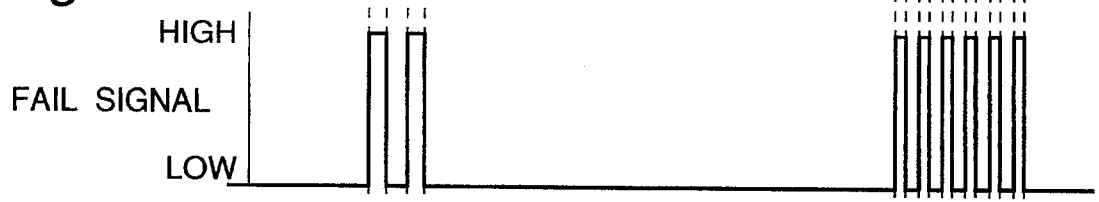
Figure 7C:
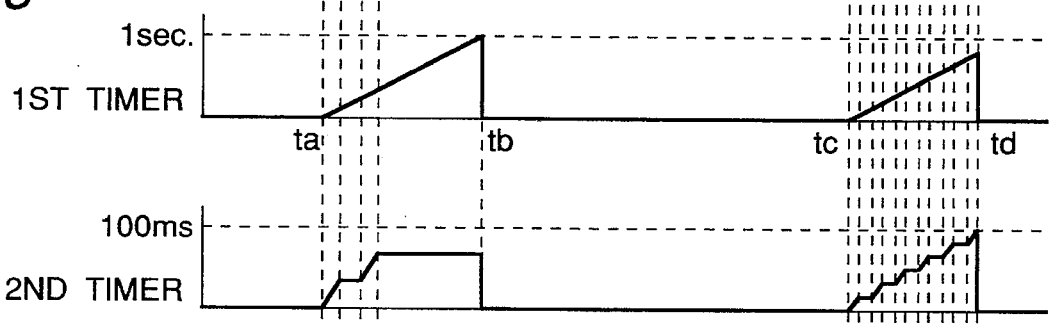
Figure 7D:
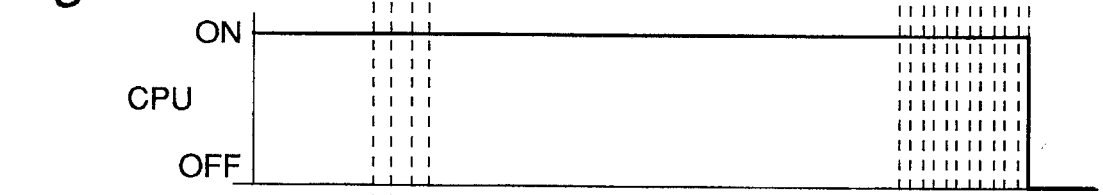
Figure 7E:

FIG. 7A illustrates the operation when the U-phase voltage signal from the converter 6, i.e. the voltage signal indicating the motor current, exceeds 5 V. As described above, the first timer again counts a continuous predetermined (1 sec.) period, during which time the second timer accumulates the fail signal HIGH time (FIG. 7B). If the cumulative fail signal HIGH time counted by the second timer reaches a predetermined limit, e.g., 100 ms in this example, during this period, the CPU 4 outputs an OFF signal completely turning the PWM inverter drive circuit 9 off (FIG. 7D).

Figure 3:
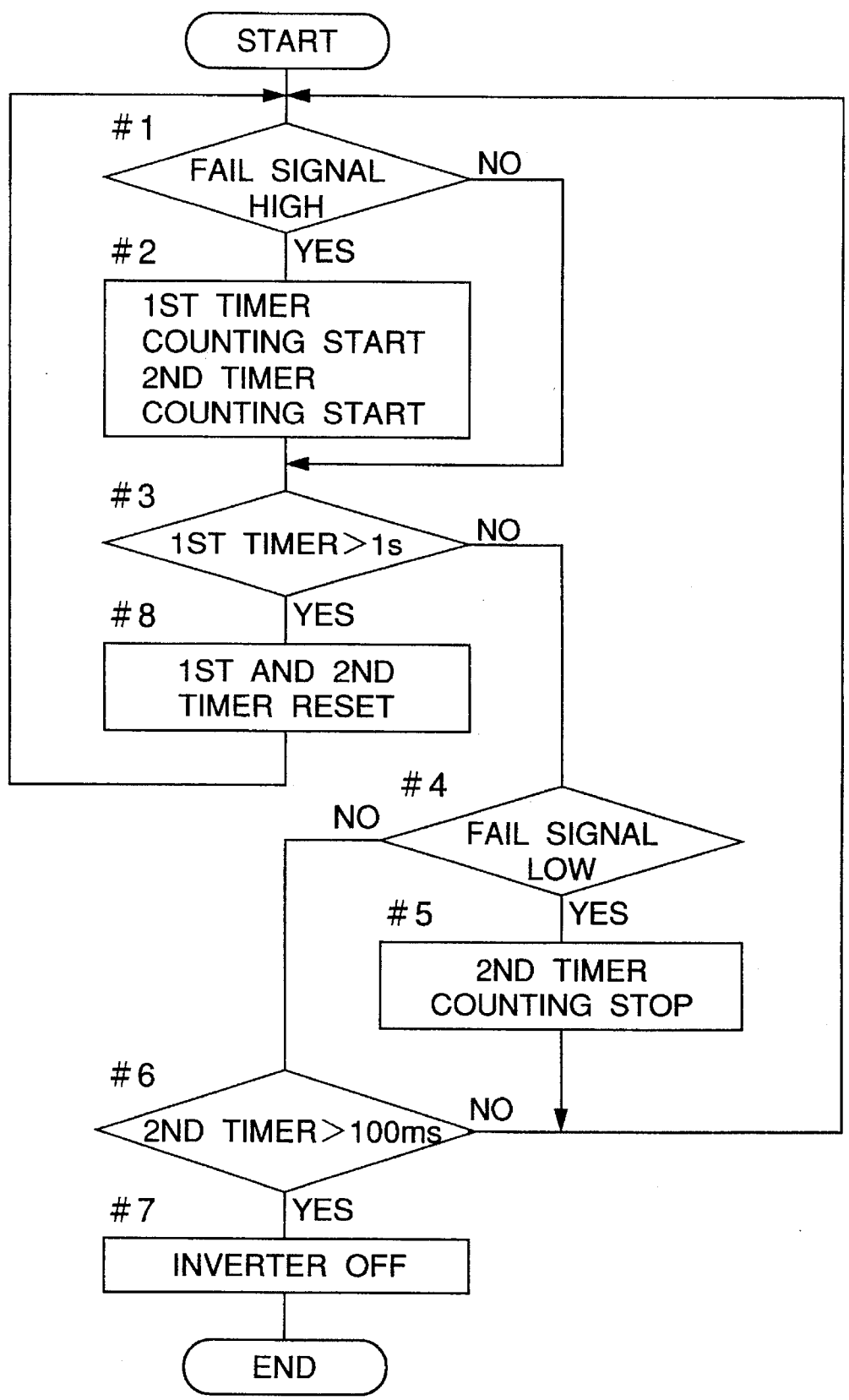
FIG. 3 is a flow chart used to describe the operation of the CPU shown in FIG. 1.

The operation of the CPU 4 is described next with reference to the flow chart in FIG. 3.

The operation when the fail signal is LOW is described first. At step #1 the fail signal is not HIGH, and control thus skips to step #3. At step #3, the first timer count is not greater than 1 sec., and control thus flows to step #4. At step #4 the fail signal is determined LOW, and control passes to step #5. The second timer is stopped at step #5, and the procedure loops back to step #1. It is to be noted that the second timer is not counting at step #5 during this pass through the procedure, and there is therefore no change in operation.

It is next assumed that the fail signal has become HIGH. In this case, step #1 passes control to step #2 because of the HIGH fail signal. The first and second timers start operating (at step #2), and control passes to step #3. Step #3 determines whether the first timer count is less than 1 sec.; control passes to step #4 because the timer count is still less than 1 sec. during this pass through the loop. Because the fail signal is still HIGH at this point, step #4 passes control to step #6, and it is determined whether the second timer count is greater than 100 ms. Because the second timer count is still less than 100 ms at this point, control loops back to step #1.

It is now assumed that the fail signal has switched from HIGH to LOW. In this case, the LOW state of the fail signal causes step #1 to pass control to step #3, which in turn passes control to step #4 because the first timer count is less than 1 sec. Step #4 in turn passes control to step #5 because the fail signal is now LOW. The second timer also stops counting at this time because the fail signal is LOW, and control loops back to step #1.

It is now assumed that the fail signal has again become HIGH. In this case, step #1 passes control to step #2, and the paused second timer is restarted. Step #3 determines whether the first timer count is less than 1 sec.; control passes to step #4 if the timer count is still less than 1 sec., and step #4 passes control to step #6 because the fail signal is HIGH at this point. If the second timer count is still less than 100 ms, control loops back to step #1.

It is now assumed that the first counter has counted to one second. Control passes to step #3 whether the fail signal is HIGH or LOW. If it is then determined (step #3) that the first counter count has exceeded the limit (1 sec.), control passes to step #8. Step #8 resets both first and second timers, and control then loops back to step #1.

It is now assumed that the first counter count is less than 1 sec., but the second timer count has exceeded the limit, i.e., 100 ms in this example. In this case, control flows from step #1 to step #2 and to step #3, from step #3 to step #4, and from step #4 to step #6 because the fail signal is HIGH and the first timer count is less than 1 sec. However, because the second timer count has exceeded the limit (100 ms), control then passes to step #7, thus forcing the inverter OFF and the CPU 4 to terminate motor drive.

Figure 4:
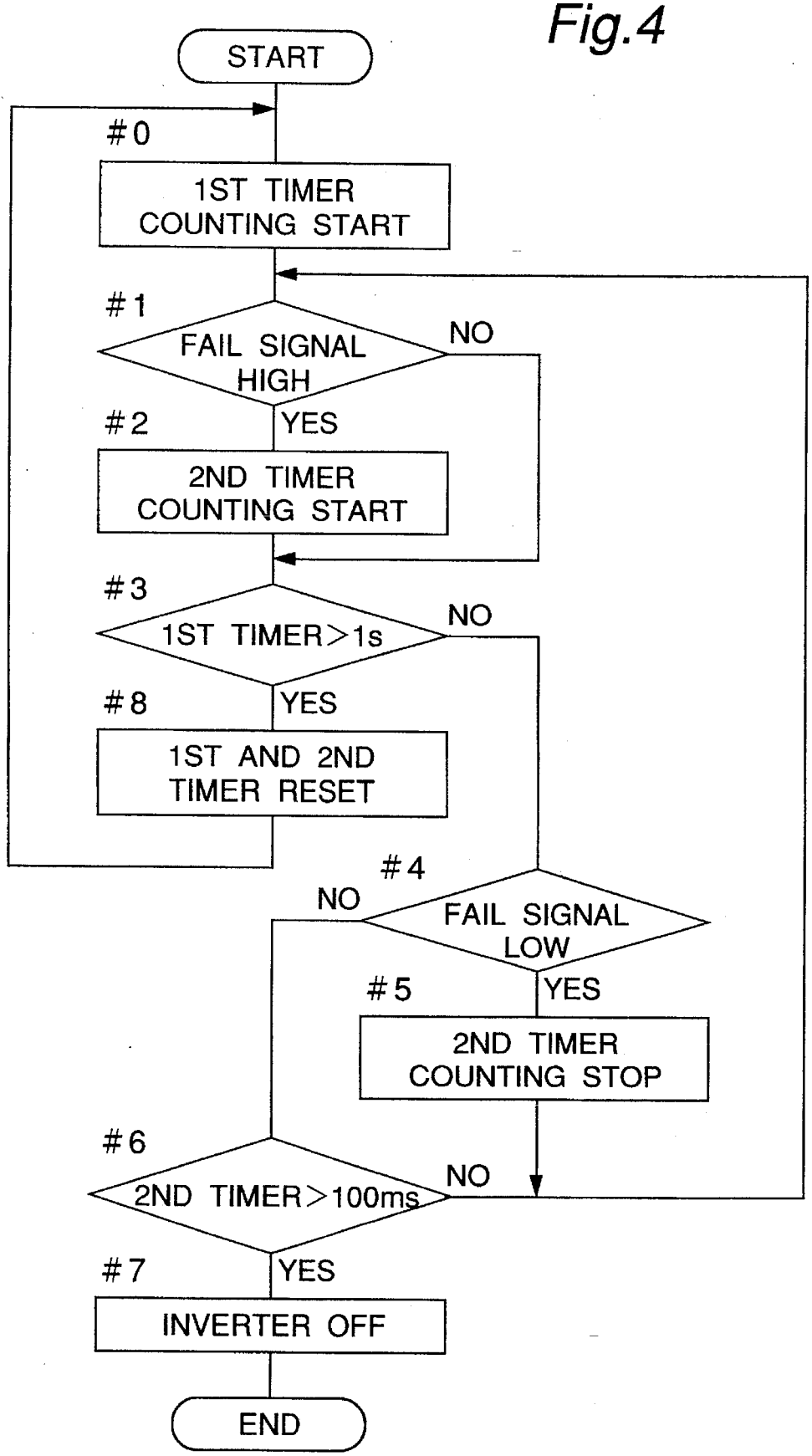
FIG. 4 is a flow chart of an alternative embodiment of the method shown in FIG. 3.

While the first timer count begins when the fail signal first becomes HIGH in the above embodiment, it is also possible for the first timer to repeatedly count 1-sec. periods and then reset irrespective of the HIGH or LOW fail signal status. A control method implementing this technique is shown in FIG. 4. Specifically, the first timer starts counting at step #0, and the count is evaluated at step #3. If the count exceeds 1 sec. at step #3, control passes to step #8, whereby both the first and second timers are reset. Control then loops back to step #0 and the first timer is started again. Other aspects of this control method are the same as described above, and further description is therefore omitted.

By temporarily stopping the control circuit when the current flowing to the power elements of an electric cars exceeds a predetermined threshold value, and resuming control circuit operation when said current drops below the threshold value, the motor control circuit of the present invention prevents damage to motor components and provides for safe operation of an electric car even when a motor current problem develops because the electric car is not stopped immediately even when the motor current exceeds the threshold value. In addition, electric car fires and related accidents can also be prevented when the current exceeds said threshold value because the time the current exceeds said threshold value is counted and the control circuit is completely shut down when the cumulative overcurrent time exceeds a preset time limit.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A control circuit for supplying current to a motor comprising:

a current supply means for supplying current to said motor;

a current detection means for detecting the current supplied by said current supply means;

a monitoring means for outputting a fail signal to disable said current supply means when the detected current exceeds a predetermined threshold value, and for terminating the fail signal to re-enable said current supply means when the detected current drops below a predetermined value;

a fail signal counter for counting only the time during which the fail signal is output; and a control means for disabling said current supply means when the cumulative time counted by said fail signal counter exceeds a first predetermined time limit.

2. A control circuit according to claim 1 further comprising a second time counter for counting up to a second predetermined time limit, said control means disabling said current supply means when the cumulative time counted by said fail signal counter exceeds the first predetermined time limit before said second time counter reaches said second predetermined time limit.

3. A control circuit according to claim 2 wherein said second time counter begins counting said second predetermined time limit in response to the fail signal.

4. A control circuit according to claim 2 wherein said second time counter repeatedly counts up to said second predetermined time limit.

5. A control circuit according to claim 1, wherein said monitoring means receives said current along with a voltage supplied to said current supply means, said monitoring means outputting a fail signal to disable the current supply means when at least one of said current and voltage exceeds a respective predetermined value, and terminating fail signal output to reenable the current supply means when said at least one of said current and voltage drops below said respective predetermined value.

* * * * *

UNITED STATES PATENT AND TRADEMARK OFFICE
CERTIFICATE OF CORRECTION

PATENT NO. : 5,592,355
DATED : January 7, 1997
INVENTOR(S) : Y. IKKAI et al.

It is certified that error appears in the above-indentified patent and that said Letters Patent is hereby corrected as shown below:

Title page, item [56], "References Cited", U.S. PATENT DOCUMENTS", line 2, change "5,460,531" to --- 5,461,531---.

Signed and Sealed this

Thirteenth Day of May, 1997

*Attest:*

BRUCE LEHMAN

*Attesting Officer*     Commissioner of Patents and Trademarks